United States Patent

Hess

[11] 4,049,323
[45] Sept. 20, 1977

[54] BRAKE PRESSURE CONTROL VALVES WITH FLUID PRESSURE RESPONSIVE VALVE

[75] Inventor: Wolfgang Hess, Koblenz, Germany

[73] Assignee: Girling Limited, Birmingham, England

[21] Appl. No.: 550,996

[22] Filed: Feb. 19, 1975

[30] Foreign Application Priority Data

Feb. 20, 1974 United Kingdom ............... 7802/74

[51] Int. Cl.² ............................ B60T 8/18; B60T 8/26
[52] U.S. Cl. ................................. 303/6 C; 188/349; 303/22 R
[58] Field of Search .......... 137/495, 494, 557, 505.14, 137/505.15, 505.41, 509, 461, 484.2, 498, 116.3; 116/1, 65, 115; 192/4 A, 109 F; 60/534, 535; 303/6 C, 6 R, 6 A, 84, 22; 188/349, 195, 151 A, 345

[56] References Cited

U.S. PATENT DOCUMENTS

| | | | |
|---|---|---|---|
| 2,923,576 | 2/1960 | Seale | 137/498 X |
| 3,143,127 | 8/1964 | Frost | 137/495 X |
| 3,276,470 | 10/1966 | Griffing | 137/505.41 X |
| 3,459,000 | 8/1969 | Oberthur | 303/6 C |
| 3,467,440 | 9/1969 | Strien | 137/505.14 X |
| 3,736,031 | 5/1973 | Yabuta et al. | 303/6 C |
| 3,790,221 | 2/1974 | Fulmer | 188/349 X |
| 3,804,468 | 4/1974 | Ishikawa et al. | 188/349 X |
| 3,850,273 | 11/1974 | Murakami | 137/505.15 X |

Primary Examiner—Trygve M. Blix
Assistant Examiner—Douglas C. Butler
Attorney, Agent, or Firm—Scrivener, Parker, Scrivener & Clarke

[57] ABSTRACT

A pressure control assembly comprises a control valve set for controlling communication between an inlet and an outlet, a control spring acting in a sense to resist closure of the valve set and a device for varying the control force of the control spring acting on the valve set. The device for varying the control force may comprise a differential pressure responsive member which moves in response to a differential pressure to move an abutment engaging the spring between normal and actuated positions to compress or expand the spring and thus vary its force.

5 Claims, 3 Drawing Figures

BRAKE PRESSURE CONTROL VALVES WITH FLUID PRESSURE RESPONSIVE VALVE

This invention relates to control valve assemblies for vehicle braking systems.

Modern vehicle braking systems are commonly of the dual type, having separate pressure sources and lines to the front and rear wheel brakes, respectively, of the vehicle, and a control valve (such as a pressure reducing or limiting valve) inserted in the line to the rear wheel brakes to compensate for the well known effects of weight-transfer during braking. It is also known to include a pressure differential warning actuator (P.D.W.A.) which operates to initiate a warning signal in the event of one line losing pressure, and to arrange, in these circumstances, for the control valve to be rendered ineffective, so that full braking pressure is available at the rear wheel brakes if the front brake pressure line should fail.

Such arrangements are not, however, satisfactory where the braking system has a pressure source supplying pressure fluid to wheel brakes at both the front and rear wheels of the vehicle. In systems of this form a complete disablement of the control valve can result in undesirably high braking efforts being developed in the rear wheel brakes, relative to the front wheel brakes.

In accordance with the present invention, there is provided a pressure control valve assembly comprising a control valve set, a pressure differential responsive actuator, an internal control valve spring means acting in a sense to resist closure of the valve set, and force-varying means responsive to actuation of the actuator to vary the force of the internal control spring means acting on the valve set.

In each of the particular embodiments described in detail below, the internal spring means engages an adjustable abutment which is moved between a normal position and an actuated position in direct consequence of actuating movement of a pressure responsive member of the actuator, which is preferably a P.D.W.A.

The force transmitted by the internal spring means may be reduced, to lower the cut-off point of the valve, or increased to raise the cut-off point, according to the requirements of the braking system in which the control valve is to be incorporated.

These presently preferred embodiments of the invention will now be described in detail, by way of example, with reference to the accompanying drawings wherein.

The same reference numerals are used in each drawing to identify corresponding parts of the different constructions.

Figure 1:
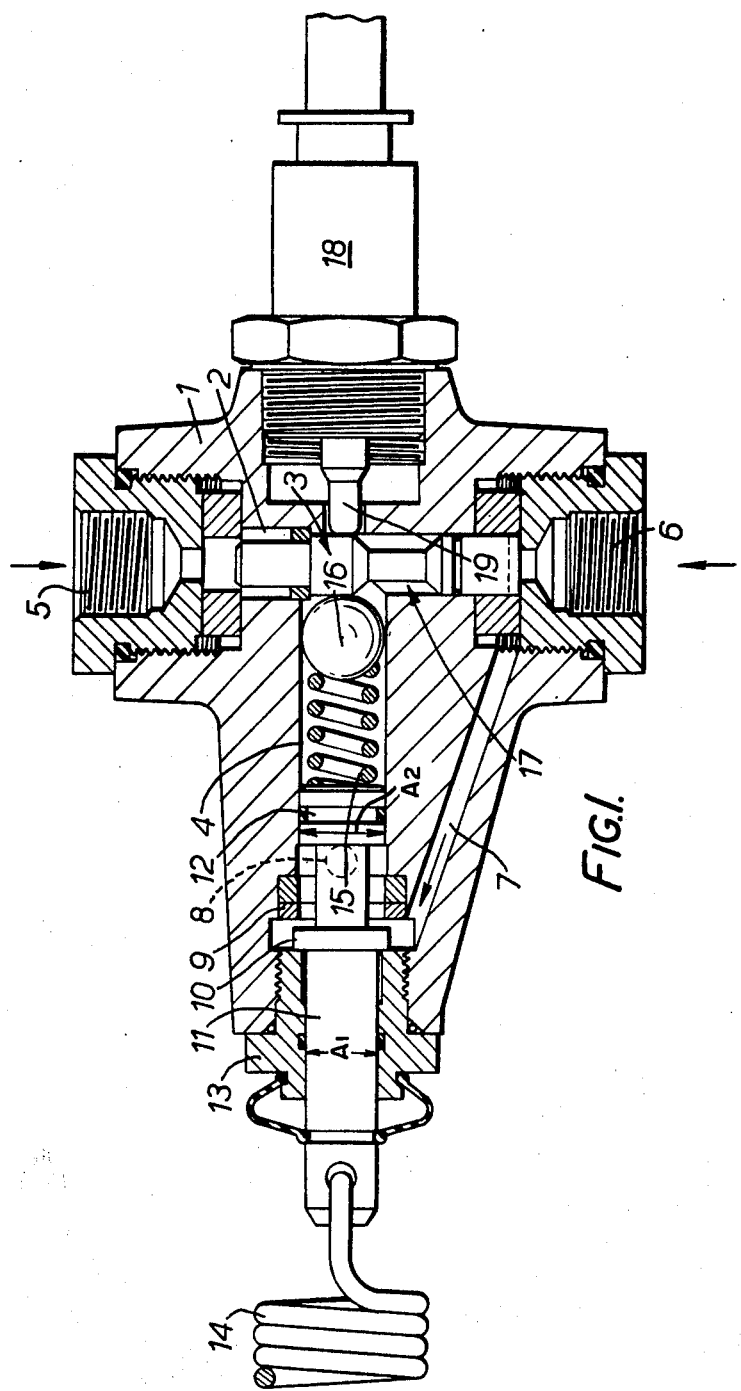
FIG. 1 is an axial cross-sectional view of one embodiment of a control valve assembly constructed in accordance with the invention.

The arrangement shown in FIG. 1 comprises a housing 1 having a piston bore 2 for a double-ended piston structure 3 and a stepped valve bore 4 transverse to and intersecting the piston bore. The piston bore has respective inlets 5 and 6 at its opposite ends, the inlet 6 being connected by an internal passage 7 to the large diameter (inlet) end of the valve bore 4. An outlet 8 is connected to an intermediate portion of the valve bore and fluid flows from the inlet 6 to the outlet 8 as indicated by the arrow in the passage 7. A valve seat 9 is provided in the bore 4, between the inlet end and the outlet 8, for co-operation with a closure member 10 formed on a plunger 11 having at its inner end a piston 12 working in the narrower, inner end of the valve bore 4. The outer portion of the plunger extends in sealed relation through a closure plug 13 and at its outer end is attached to an external control spring in the form of a tension spring 14.

An internal control spring in the form of a coil compression spring 15 works between the inner face of piston 12 and a ball abutment 16. The forces of the respective springs 14 and 15 are thus additive, tending to urge the plunger 11 outwardly (to the left) and thereby to open the valve set formed by closure member 10 and valve seat 9.

The control valve is of the pressure limiting type and closes when the inlet pressure acting over an annular area $A_1$ corresponding to the full area of piston 12 minus the area $A_2$ of the sealed stem of plunger 11 is sufficient to overcome the forces applied to the plunger by the springs 14 and 15. This pressure is the so-called cut-off pressure and is variable by alteration of the spring loads. The spring 14 will normally be stressed in proportion to the vehicle loading, in known manner.

The piston 3 of the P.D.W.A. is shown in FIG. 1 in its normal, unactuated position, in which the pressure at the inlet 5 is at least as great as the pressure in the inlet 6. In this position, the ball abutment 16 bears against a full diameter portion of the piston, to one side of an annular recess 17. Aligned with the valve bore 4 is an electrical switch assembly 18 having an operating plunger 19 also normally engaging the full diameter portion of the piston 3.

In use, the inlet 5 is connected to a first pressure source supplying a set of front wheel brake cylinders and the inlet 6 to a separate pressure source supplying a separate set of front wheel brake cylinders and also supplying the rear wheel brake cylinders of a four-wheeled road vehicle.

While both pressure sources are fully effective, the P.D.W.A. piston remains in its illustrated position and the control valve operates in the normal manner. Failure or partial failure of the second pressure system to inlet 6 has no effect on the P.D.W.A. since the now dominant pressure in inlet 5 maintains the piston in its illustrated position. However, if there is a total or partial failure of pressure from the first source, brake application develops pressure in the inlet 6 to displace the piston 3 to its opposite end position, bringing the annular recess 17 into register with the ball 16 and the switch plunger 19, the latter moving radially inwardly (to the left) under its own spring bias to actuate switch 18 and thereby initiate a warning signal in known manner. Movement of the ball 16 into the recess permits expansion of the spring 15 and thereby a reduction in the outward force exerted by the spring on the plunger 11. This reduction of the total spring force on the plunger has the effect of reducing the cut-off pressure of the valve, which will accordingly limit the pressure transmitted to the rear brakes and thereby compensate for the partial loss of braking effort at the front brakes due to loss of the full pressure of the failed pressure source.

Figure 2:
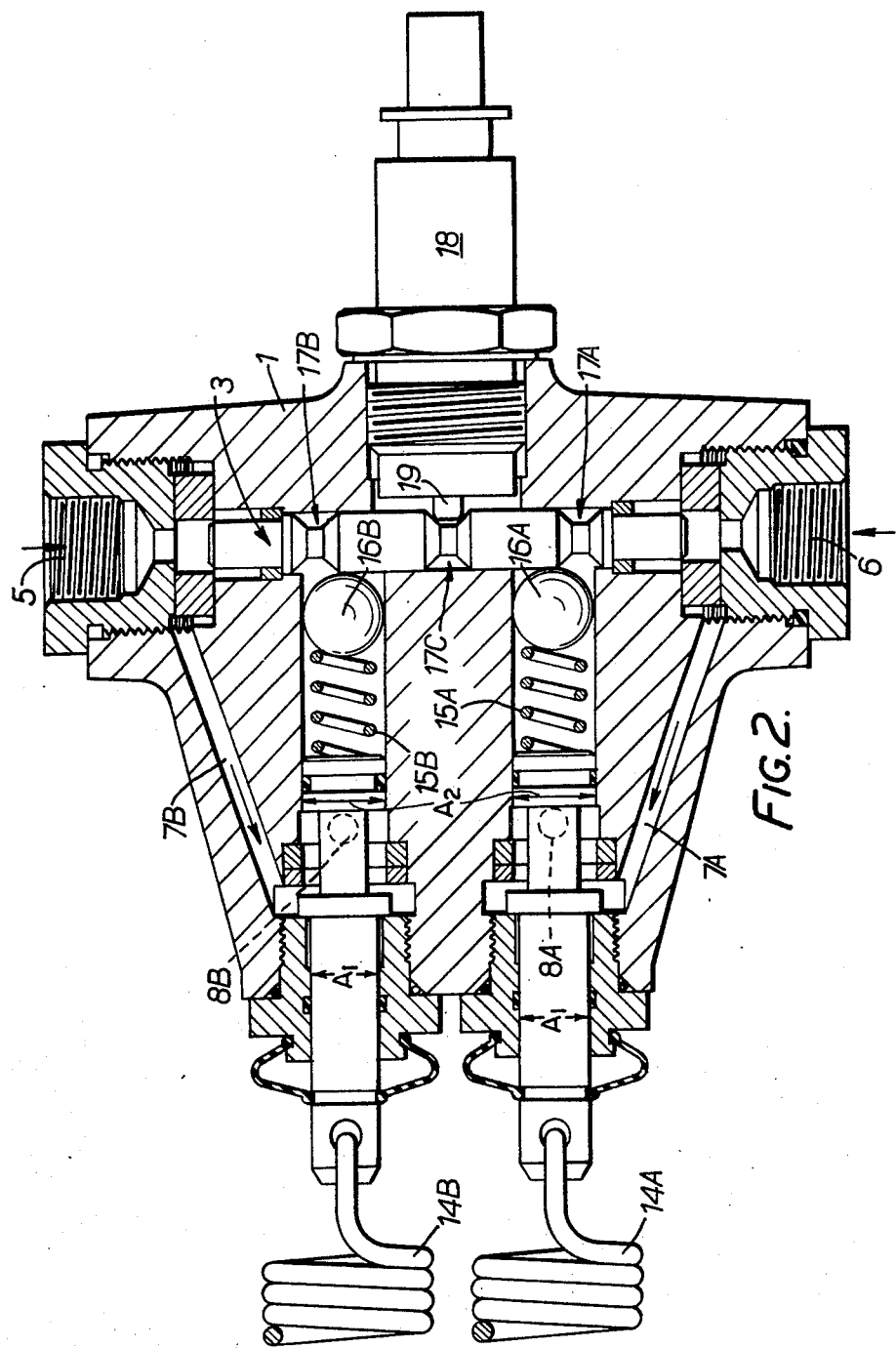
FIG. 2 is a view similar to FIG. 1 but showing a second embodiment.

The valve shown in FIG. 2 is similar in construction and operation to that of FIG. 1, except that it comprises two control valve assemblies in parallel valve bores 4A, 4B having respective outlets 8A, 8B and whose larger diameter ends are connected by internal passages 7A, 7B to the respective inlets 6 and 5. Each valve assembly also has its own external control spring 14A or 14B, internal control spring 15A or 15B and ball abutment 16A or 16B. The P.D.W.A. piston 3 is in this case free to move axially in either direction away from its medial, normal position illustrated. It has respective recesses 17A, 17B for cooperation with balls 16A, 16B, the recesses being normally positioned axially outwardly of the balls. At its centre, the piston has a recess 17C which receives the switch plunger 19. In this case, the switch is in a passive state when the plunger is extended and is actuated by depression of the plunger.

In a typical installation, the inlet 5 is connected to a first pressure source which supplies a set of front wheel brake pressure spaces and, through the outlet 8B a rear wheel brake cylinder on one side of the vehicle. Inlet 6 is connected to a second pressure source serving a second group of front wheel brake pressure spaces, and through the outlet 8A, a rear wheel brake cylinder on the other side of the vehicle. This layout is known in itself and commonly referred to as an 'L' split system.

In normal operation the two control valves operate to limit the pressure transmitted to the rear brake cylinders at levels determined by the respective control springs acting on the valve plungers. In the event of pressure failure in one system, say the system feeding inlet 5, the piston 3 is displaced axially towards that inlet, the switch plunger 19 being depressed to actuate the warning switch 18. Also, the ball 16A enters recess 17A to reduce the force of spring 15A and thus reduce the cut-off pressure at which the pressure transmitted from inlet 6 to outlet 8A is limited. This prevents excess braking pressure being developed on the one rear wheel brake which is operative. Of course, failure of the other pressure system alone will have a corresponding effect.

Figure 3:
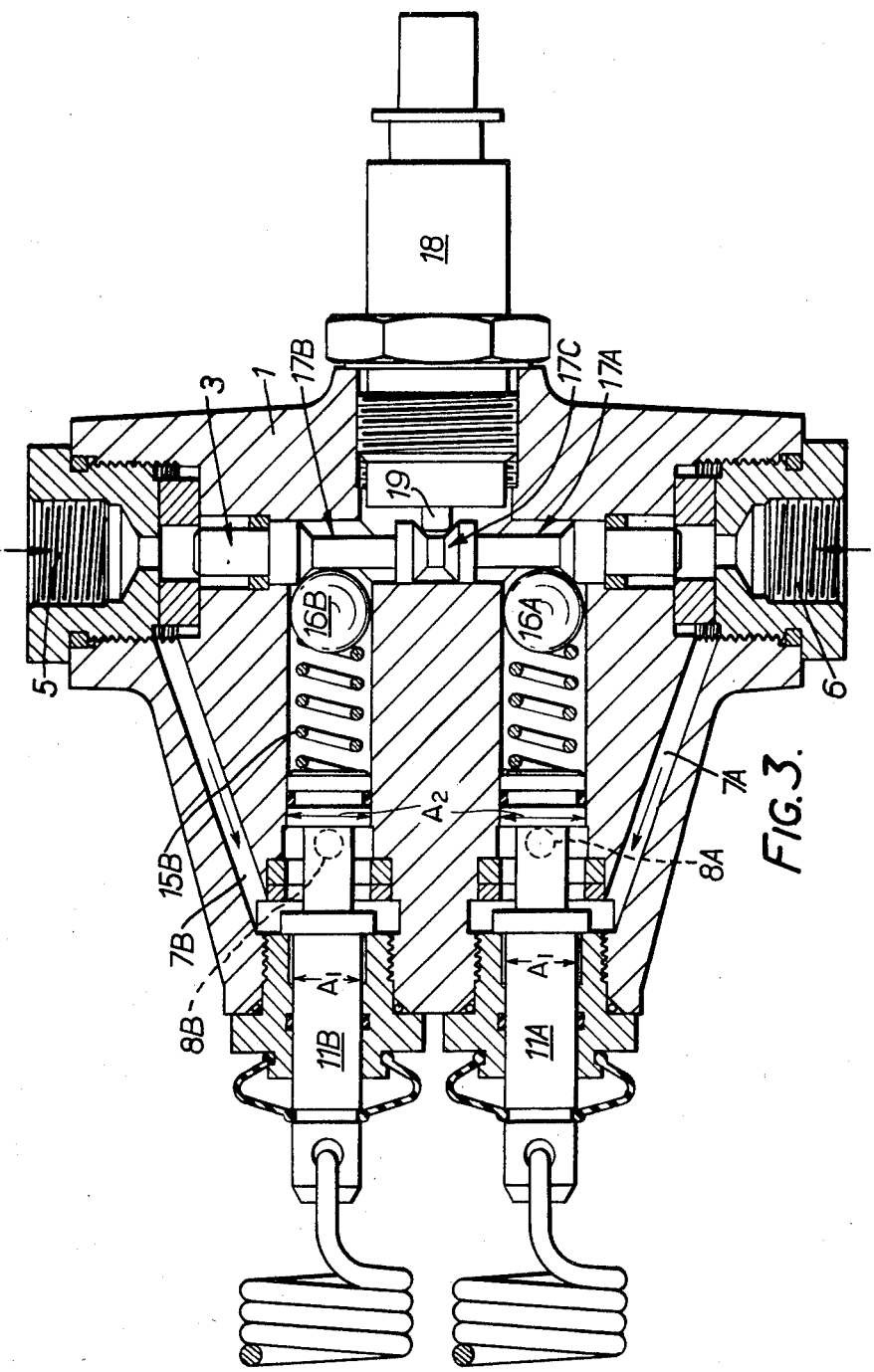
FIG. 3 is a view similar to FIGS. 1 and 2 showing a third embodiment.

The valve shown in FIG. 3 is generally similar to that of FIG. 2, except that in this case the arrangement is such that failure of one pressure system results in the cut-off point of the control valve in the other system being raised by making $A_1$ larger than $A_2$, rather than the reverse as before. To this end, the piston 3 has axially elongated recess 17A, 17B in which the ball abutments 16A, 16B are normally received.

In a typical installation of the so-called diagonal split type, the inlet 5 is connected to a first pressure source supplying one front wheel brake and one diagonally opposite rear wheel brake, the latter through outlet 8B, and the inlet 6 is connected to a second pressure source supplying the other diagonally opposed front and rear wheel brakes.

In the event of one pressure source failing, say the source connected to inlet 5, the dominant pressure inlet 6 moves the piston 3 axially towards inlet 5 to operate the switch 18 as before. The ball 16B is unaffected, but the ball 16A is displaced by the piston 3 to compress spring 15A and thereby increase the total spring force acting on plunger 11A, thus raising the cut-off pressure of the control valve and the maximum pressure which can be transmitted to outlet 8A. This has the effect of preventing excessive braking on one side of the vehicle at a front brake, relative to the other side of the vehicle at a rear brake. It is, of course, still desirable to limit the braking pressure developed at the rear brake, relative to the front brake at high braking pressures, in order to reduce the risk of skidding, hence the necessity to limit the rear braking pressure, but at a higher level than is normal.

It will be understood that many variations and modifications will be possible within the scope of the invention. For example, the pressure limiting valves could readily be replaced by reducer valves, and the external control springs can be pre-set, rather than vehicle load-conscious. It would also be possible to omit the indicating function of the pistons 3, i.e. by leaving out the electric switch assemblies, by current legislation in many countries makes the provision of an audible or visual warning essential in dual pressure braking systems so that, as a practical matter, this possible modification will find very limited applicability.

I claim:

1. A pressure control valve assembly for use in vehicle braking system having separate pressure circuits, comprising a fluid pressure responsive valve adapted to be inserted in one of said circuits for controlling the flow of pressure fluid therein, the valve having a valve closure member and a cooperating valve seat, spring means urging said valve to an open position, a pressure differential responsive member adapted to be subjected at opposed ends respectively to the pressures in said circuits and normally occupying a first position, and force varying means having an operative connection with said spring means and with said pressure differential responive member for varying the force with which the spring means acts on said valve, and therefore the pressure at which said valve responds, when said pressure differential responsive member is moved from its first position to a second position in response to a pressure differential in said circuits, said force varying means comprising an adjustable abutment which is movable between a normal position and an actuated position in direct consequence of actuating movement of said pressure differential responsive member, means defining a first bore within which said abutment is movable and means defining a second bore extending transversely to said first bore within which said pressure differential responsive member is movable.

2. A valve assembly according to claim 1, wherein said pressure differential responsive member includes at least one recess therein and a land adjacent said recess, and wherein the abutment co-operates with a recess in the pressure differential responsive member in one of its positions and with an adjacent land on the pressure differential responsive member in the other of its positions.

3. A valve assembly according to claim 1, wherein said abutment comprises a member located between and directly engaging said spring means and said pressure differential responsive member.

4. A valve assembly according to claim 1 wherein said spring means acting on said valve in a sense to resist closure of said valve comprises at least two springs.

5. A pressure control valve assembly for use in a vehicle braking system having separate pressure circuits, comprising a fluid pressure responsive valve adapted to be inserted in one of said circuits for controlling the flow of pressue fluid therein, the valve having a valve closure member and a cooperating valve seat, spring means urging said valve to an open position, a pressure differential responsive member adapted to be subjected at opposed ends respectively to the pressures in said circuits and normally occupying a first position, and force varying means having an operative connection with said spring means and with said pressure differential responsive member for varying the force with which the spring means acts on said valve and therefore the pressure at which said valve responds, when said pressure differential responsive member is moved from its first position to a second position in response to a pressure differential in said circuits, said force varying means comprising an adjustable abutment which is movable between a normal position and an actuated position in direct consequence of actuating movement of said pressure differential responsive member, said abutment being in the form of a ball.

* * * * *